United States Patent
Ogata (10) Patent No.: US 8,839,014 B2
(45) Date of Patent: Sep. 16, 2014

(54) APPARATUS AND METHOD FOR SHORTENING TIME FOR TRANSITIONING POWER MODE OF NETWORK COMMUNICATION DEVICE BY UTILIZING A SHARED STORAGE UNIT, A SOCKET, AND A SOCKET WRAPPER

(75) Inventor: Hideaki Ogata, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 284 days.

(21) Appl. No.: 13/397,555

(22) Filed: Feb. 15, 2012

(65) Prior Publication Data

US 2012/0216063 A1    Aug. 23, 2012

(30) Foreign Application Priority Data

Feb. 17, 2011  (JP) ................................. 2011-032353

(51) Int. Cl.
   *G06F 1/00*    (2006.01)
   *G06F 1/32*    (2006.01)

(52) U.S. Cl.
   CPC ........... *G06F 1/3284* (2013.01); *Y02B 60/1267* (2013.01); *G06F 1/3215* (2013.01); *G06F 1/3203* (2013.01)
   USPC ........................................................ 713/323

(58) Field of Classification Search
   CPC .... G06F 1/3203; G06F 1/3215; G06F 1/3284
   See application file for complete search history.

(56) References Cited

U.S. PATENT DOCUMENTS

| | | | |
|---|---|---|---|
| 7,962,775 B1 * | 6/2011 | Vaidyu et al. | 713/323 |
| 2008/0072014 A1 * | 3/2008 | Krishnan et al. | 712/43 |
| 2008/0158574 A1 * | 7/2008 | Sugiyama | 358/1.1 |
| 2009/0228970 A1 * | 9/2009 | Morimoto | 726/12 |
| 2010/0325458 A1 * | 12/2010 | Yamaguchi | 713/323 |

FOREIGN PATENT DOCUMENTS

| | | |
|---|---|---|
| JP | 2003-076451 A | 3/2003 |
| JP | 2003-089254 A | 3/2003 |
| JP | 2004-005029 A | 1/2004 |
| JP | 2007-286859 A | 11/2007 |
| JP | 2008-167224 A | 7/2008 |
| JP | 2010-010942 A | 1/2010 |

\* cited by examiner

*Primary Examiner* — Thomas Lee
*Assistant Examiner* — Zhipeng Wang
(74) *Attorney, Agent, or Firm* — Maschoff Brennan (57) ABSTRACT

A network communication device includes a first control unit that has a first application, a second control unit that has a second application and a communication processing section, and a shared storage unit, wherein, in a first mode where the first control unit is in an operation state, the first application performs a predetermined process using the shared storage unit, and the communication processing section performs communication in response to an instruction from the first application, and wherein, if the first control unit transitions from the first mode to a second mode in which power consumption is lower than that in the first mode, the first application stops execution of the process, the second application performs a process based on data related to the first application, stored in the shared storage unit, and the communication processing section performs communication in response to an instruction from the second application.

9 Claims, 11 Drawing Sheets

APPARATUS AND METHOD FOR SHORTENING TIME FOR TRANSITIONING POWER MODE OF NETWORK COMMUNICATION DEVICE BY UTILIZING A SHARED STORAGE UNIT, A SOCKET, AND A SOCKET WRAPPER

BACKGROUND

1. Technical Field

The present invention relates to a network communication device technique, and more particularly to a technique in which a network communication device and a peripheral apparatus including the network communication device are operated so as to save power.

2. Related Art

At present, a printer, a scanner, or a multifunction machine (hereinafter, referred to as a "peripheral apparatus") may perform printing by receiving printing data from a PC or the like or transmit image data scanned with the scanner to the PC or the like, via a communication network (hereinafter, referred to as a "network") such as a wired LAN (Local Area Network) or a wireless LAN. Since there are many cases where the peripheral apparatus is supplied with power at all time in these use circumstances, recent peripheral apparatuses have a power saving mode mounted therein for reducing power consumption when not used.

For example, JP-A-2003-89254 discloses an invention in which an image processing apparatus includes a controller unit that can process or store image information and an input and output unit that inputs and outputs information to and from a network; if the image processing apparatus is in a normal operation mode, the controller unit controls the input and output unit so as to transmit and receive data; and if the controller unit transitions to a low power consumption mode, the input and output unit controls transmission and reception of data.

In JP-A-2003-89254, when a transition is performed from the normal operation mode to the low power consumption mode, a process is taken over to the input and output unit from the controller unit. At this time, it is necessary for data stored in a RAM (Random Access Memory) of the controller unit to be copied to a RAM of the input and output unit. In addition, it is necessary to initialize a communication interface. However, since the copy of data and the initialization of the communication interface take time, the transition process from the normal operation mode to the low power consumption mode also takes time. In addition, the same problem also occurs when a transition from the low power consumption mode to the normal operation mode is performed. In addition, since data received from the network may not be processed in the course of the transition, if the transition takes time, there is concern that the received data may be lost.

SUMMARY

An advantage of some aspects of the invention is to shorten time for a transition from another mode to a power saving mode, or from the power saving mode to another mode.

Another advantage of some aspects of the invention is not to lose data which is received in the course of a transition from another mode to a power saving mode or from the power saving mode to another mode.

According to an aspect of the invention, there is provided a network communication device including a first control unit that has a first application section; a second control unit that has a second application section having the same function as the first application section and a communication processing section performing a communication process via a communication network; and a shared storage unit that can be used by the first control unit and the second control unit, wherein, in a first mode where the first control unit is in an operation state, the first application section performs a predetermined process using the shared storage unit, and the communication processing section performs communication in response to an instruction from the first application section, and wherein, if the first control unit transitions from the first mode to a second mode in which power consumption is lower than that in the first mode, the first application section stops execution of the process, the second application section performs a process based on data related to the first application section, stored in the shared storage unit, and the communication processing section performs communication in response to an instruction from the second application section.

Thereby, it is possible to shorten time for transitions from the first mode to the second mode, or from the second mode to the first mode.

The communication processing section may include a socket, and the first control unit may further include a socket wrapper that sends data transmitted by the first application section to the socket and sends data received by the socket to the first application section.

Thereby, the first control unit does not include a communication interface, and the first application section can perform communication.

The second control unit may further include a determination section that determines whether or not a transition from the second mode to the first mode is performed, and the determination section may determine whether or not data received by the communication processing section can be processed by the second application section in the second mode, and, if it is determined that the received data can be processed by the second application section, the determination section may enable the second application section to make a response about the received data in a state of maintaining the second mode, and if it is determined that the received data may not be processed by the second application section, enable the first control unit to transition from the second mode to the first mode, and enable the first application section to make a response about the received data.

Thereby, it is possible to make a response to a predetermined inquiry in the second mode without a transition to the first mode.

According to the aspect of the invention, it is possible to shorten time for a transition from another mode to a power saving mode, or from the power saving mode to another mode.

In addition, it is possible not to lose data which is received in the course of a transition from another mode to a power saving mode or from the power saving mode to another mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
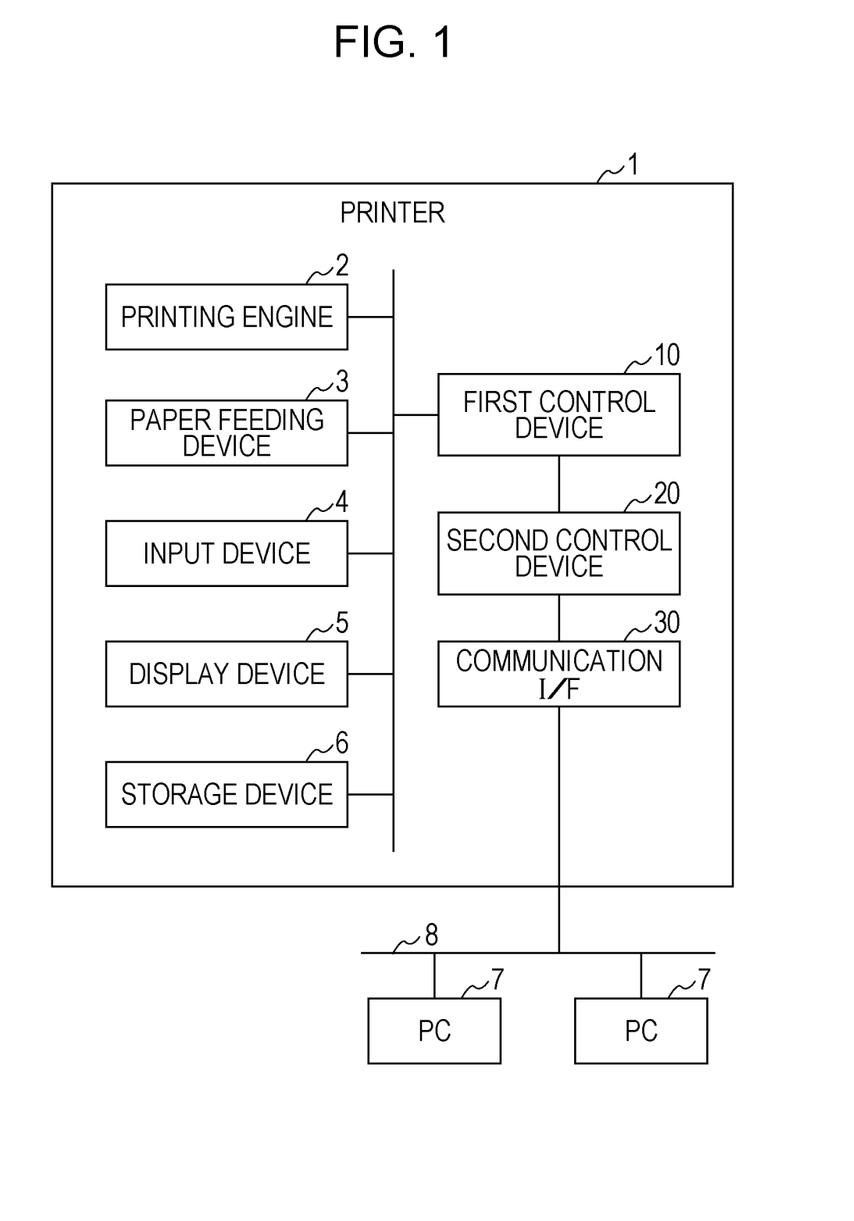
FIG. 1 is a block diagram illustrating a configuration of a printer including a network communication device according to an embodiment of the invention.

FIG. 1 is a block diagram illustrating a configuration of a printer including a network communication device according to an embodiment of the invention. In addition, although the embodiment is described using a printer as an example of the peripheral apparatus, the invention is not limited thereto, and, for example, may be applied to various peripheral apparatuses such as a scanner and a multifunction machine.

A printer 1 is connected to a PC 7 via a network 8 such as, for example, a wired LAN or a wireless LAN, and can print image data transmitted from the PC 7 on a printing medium such as paper. In addition, the printer 1 may transmit a variety of information such as a remaining amount of ink or printing situations of the printer 1 to the PC 7 via the network 8. The printer 1 includes a printing engine 2, a paper feeding device 3, an input device 4, a display device 5, a storage device 6, a first control unit 10, a second control unit 20, and a communication interface (hereinafter, referred to as a "communication I/F") 30.

The printing engine 2 is controlled by the first control unit 10 and prints characters or images on a printing medium such as paper based on image data.

The paper feeding device 3 is controlled by the first control unit 10 and feeds a printing medium such as paper on which printing is performed.

The input device 4 receives an input from a user, such as, for example, a request for confirming a remaining amount of ink or a request for setting printing quality, and sends the input to the first control unit 10. The input device 4 is constituted by, for example, a button, a switch, a touch panel liquid crystal, or a combination thereof.

The display device 5 is controlled by the first control unit 10, and displays various kinds of information of the printer 1 such as, for example, a remaining amount of ink or printing situations. The display device 5 is constituted by, for example, a liquid crystal display, a light emitting diode, or a combination thereof.

The storage device 6 stores setting information and the like of the printer 1. The storage device 6 is constituted by a nonvolatile storage medium such as, for example, an EEPROM (Electrically Erasable Programmable Read-Only Memory) or a flash memory, and can hold data stored therein even if power is not supplied to the printer 1.

The first control unit 10 controls the printing engine 2, the paper feeding device 3, the input device 4, and the display device 5, and realizes various kinds of functions (for example, a printing function, a remaining ink amount management function, a printing quality setting function, a printing situation display function, and the like) of the printer 1. If a predetermined condition is satisfied, for example, if there is no printing request from the PC 7 or there is no input from the input device 4 for a predetermined time, the first control unit 10 transitions to a power saving mode by stopping a portion or all of processes performed by the first control unit 10. Thereby, it is possible to reduce power consumption when the printer 1 is not used. Details of the first control unit 10 will be described later.

The second control unit 20 controls the communication I/F 30 and processes data which is transmitted and received between the first control unit 10 and the second control unit 20. In addition, the second control unit 20 acts as a proxy in a portion or all of processes of the first control unit 10 during the power saving mode. Details of the second control unit 20 will be described later.

The communication I/F 30 transmits data to other devices or receives data from other devices via the network 8. Details of the communication I/F 30 will be described later.

Figure 2:
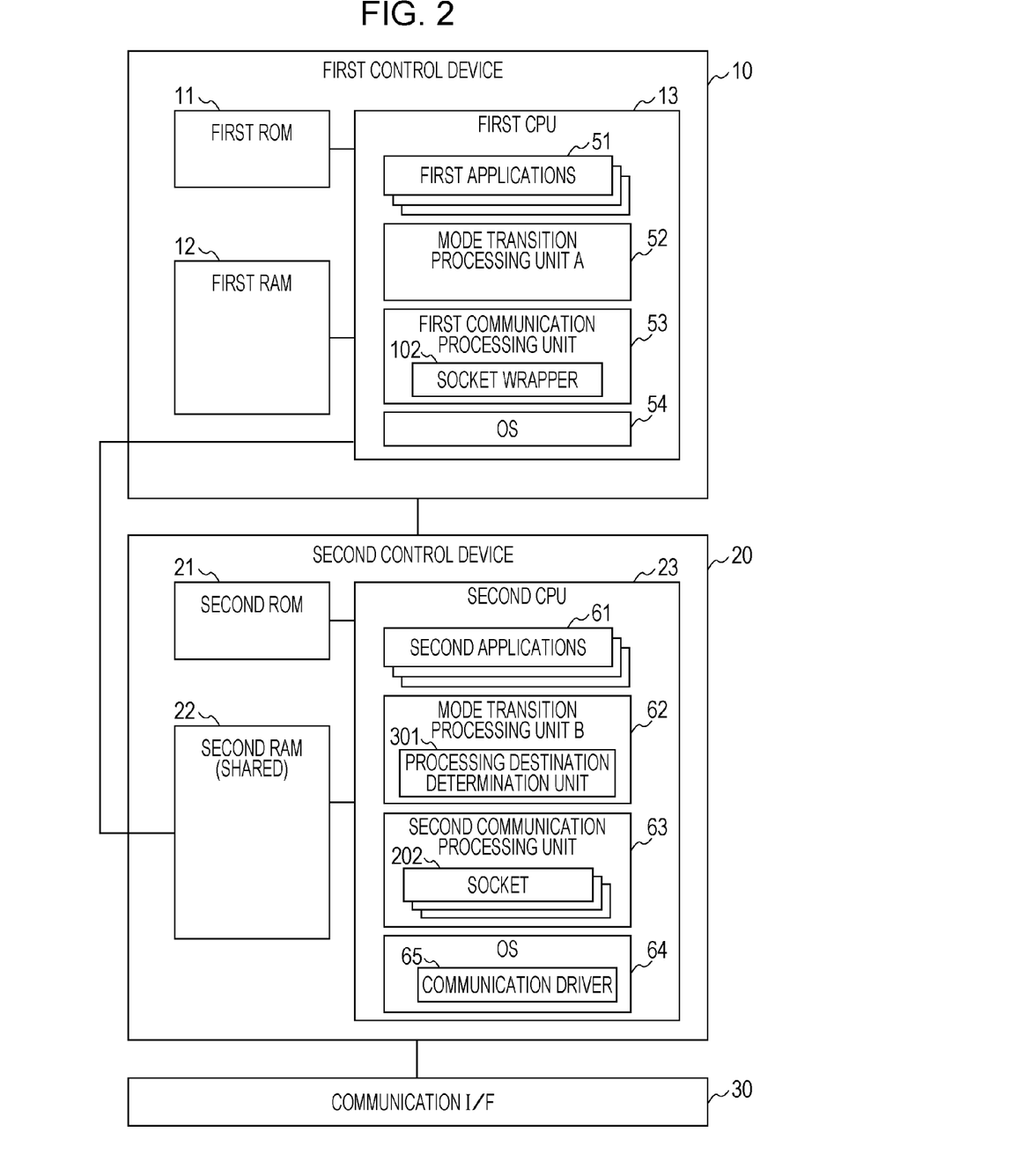
FIG. 2 is a block diagram illustrating configurations of a first control unit, a second control unit, and a communication I/F.

FIG. 2 is a block diagram illustrating configurations of the first control unit 10, the second control unit 20, and the communication I/F 30.

The first control unit 10 includes a first ROM (Read Only Memory) 11, a first RAM (Random Access Memory) 12, and a first CPU (Central Processing Unit) 13.

The first CPU 13 reads a computer program (hereinafter, referred to as a "program") from the first ROM 11 and executes the program. The first CPU 13 writes data necessary to execute the program in the first RAM or reads the data from the first RAM. In addition, the first CPU 13 also can write data in or read data from a second RAM 22 of the second control unit 20. The first CPU 13 realizes, for example, first applications 51, a mode transition processing unit A 52, a first communication processing section 53, and an OS (Operating System) 54, and the like, by executing the program read from the first ROM 11.

The first applications 51 are processing units which perform processes for realizing various functions of the printer 1. The first applications 51 include, for example, a printing control application which performs printing by controlling the printing engine 2 and the paper feeding device 3, a remaining ink amount management application which manages a remaining amount of ink or toner, a state management application which manages whether or not the printer is normally operated, and the like. In addition, a plurality of first applications 51 may be executed at the same time (in parallel). Further, the first application 51 which allows a second application 61 to make a proxy response in a power saving mode stores a portion of all of data in a predetermined storage region of the second RAM 22 which is a shared storage unit. The proxy response will be described later.

The mode transition processing unit A 52 performs a process in which the first control unit 10 transitions from a first mode (hereinafter, referred to as a "normal mode") where the first control unit 10 is in an operation state to a second mode (hereinafter, referred to as a "power saving mode") where the first control unit 10 is in a stop state, and performs a process for transition from the power saving mode to the normal mode. Here, power consumption is lower in the second mode than in the first mode. For example, when the first control unit 10 transitions from the normal mode to the power saving mode, the mode transition processing unit A 52 stops the first applications 51. In addition, after the transition to the power saving mode is completed, the mode transition processing unit A 52 instructs a mode transition processing unit B 62 to activate second applications 61. Further, the mode transition processing unit A 52 makes the first control unit 10 enter a stop state. When a transition is performed from the power saving mode to the normal mode, the mode transition processing unit A 52 activates the first applications 51 by receiving an instruction from the mode transition processing unit B 62.

The first communication processing section 53 transmits and receives data of the first applications 51. For example, the first communication processing section 53 includes a socket wrapper (a so-called dummy socket) 102 which can be used by the first applications 51 in the same manner as a typical socket. Here, the socket is used to transmit and receive data to and from other devices such as the PC 7 via the network 8. For example, if a socket 202 of the second communication processing section 63 is connected to a socket of the PC 7 on the network (logically), data written in the socket 202 of the second communication processing section 53 can be read from the socket of the PC 7, and the reverse thereof is possible. In addition, the socket wrapper 102 itself does not operate as a socket for other devices but becomes an interface for sockets in the same device (in this case, the socket 202 of the printer 1), and allows the first applications 51 to transmit and receive data to and from other devices.

The OS 54 performs scheduling or memory management of the overall programs executed by the first control unit 10.

The second control unit 20 includes a second ROM 21, a second RAM 22, and a second CPU 23.

The second CPU 23 reads a program stored in the second ROM 21 and executes the program. The second CPU 23 writes data necessary to execute the program in the second RAM 22 or reads the data from the second RAM 22. In addition, the second RAM 22 can also be accessed by the first CPU 13. In other words, the second RAM 22 is a shared storage unit which the first CPU 13 and the second CPU 23 can use by sharing. Therefore, the second RAM 22 stores transmission and reception data and application data which are used by both the first applications 51 and the second applications 61.

The second CPU 23 realizes the second applications 61, the mode transition processing unit B 62, a second communication processing section 63, an OS 64, and a communication driver 65 by executing programs read from the second ROM 21.

The second applications 61 are processing units which mainly perform processes regarding the network. The second applications 61 include, for example, a network information management application which manages IP addresses allocated to the printer 1, a proxy response application which makes a response instead of the response application which is one of the first applications 51 in the power saving mode, and the like. Here, the response application is one of the first applications 51, and is an application which responds to an inquiry from other devices. The proxy response application is one of the second applications 61, and is an application which responds to an inquiry from other devices. In addition, the proxy response application makes a response which is made by the response application in the normal mode, instead of the response application in the power saving mode. In other words, the second applications 61 have the same functions as a portion or all of functions of the first applications 51. In addition, a plurality of second applications 61 may be executed at the same time (in parallel).

Here, the proxy response application will be described. The proxy response application is an application which makes a response to an inquiry to which the first applications 51 make a response in the normal mode, instead of the first applications 51 in the power saving mode. For example, it is assumed that only the remaining ink amount management application which is one of the first applications 51 checks a remaining amount of ink. At this time, the remaining ink amount management application is not operated in the power saving mode, and thus may not make a response to an inquiry from an external device about the remaining amount of ink in the related art. For this reason, it is necessary to make a response about the remaining amount of ink after a transition is performed from the power saving mode to the normal mode and then the remaining ink amount management application is activated. However, according to the embodiment of the invention, the remaining ink amount management application stores data for the remaining amount of ink in the second RAM 22. Here, printing is not performed during the power saving mode, and thus the remaining amount of ink is not varied. Therefore, when an inquiry about the remaining amount of ink from an external device during the power saving mode, the proxy response application can return a response by reading the information for the remaining amount of ink stored in the second RAM 22. Thereby, it is possible to return a response without the transition from the power saving mode to the normal mode. Therefore, it is possible to reduce occurrence of overhead such as the transition from the power saving mode to the normal mode.

Here, any one of the response application and the proxy response application is operated at all times, and the two are operated as resident applications together. That is to say, the invention can also be applied to resident applications other than the response application. For example, when a resident application transmitting data at a predetermined cycle transitions from the normal mode to the power saving mode, a value of the cycle counter of the resident application in the normal mode may be taken over to the resident application at the time of the transition to the power saving mode. In other words, when the transition is performed from the normal mode to the power saving mode, data can be transmitted at the same cycle without disturbing the cycle.

When the first control unit 10 transitions to the power saving mode from the normal mode, the mode transition processing unit B 62 activates the second applications 61 which make a proxy response for the first applications 51. In addition, when the first control unit 10 transitions to the normal mode from the power saving mode, the mode transition processing unit B 62 stops the second applications 61 which make a proxy response, and instructs the mode transition processing unit A 52 to transition to the normal mode from the power saving mode.

Here, when the first applications 51 send a storage region of data stored in the second RAM 22 to the second applications 61, a storage region of the second RAM 22 which is commonly used by the first applications 51 and the second applications 61 may be set in advance. Alternatively, the mode transition processing unit A 52 may send a storage region of data which is stored in the second RAM 22 by the first applications 51 to the mode transition processing unit B 62, and the mode transition processing unit B 62 may send the storage region to the second applications 61.

In addition, a correspondence relationship regarding which of the second applications 61 makes a proxy response for one of the first applications 51 is assumed to be defined in advance. As a method of defining the correspondence relationship, for example, the first applications 51 and the second applications 61 may be correlated with each other one to one, or the first applications 51 and the second applications 61 may be correlated with a protocol of received data. For example, if the protocol of received data is an HTTP (Hyper Text Transfer Protocol), the first applications 51 and the second applications 61 correlated with a process of the HTTP process the received data, and if the protocol of received data is an SNMP (Simple Network Management Protocol), the first applications 51 and the second applications 61 correlated with the SNMP process the received data. In this case, for example, when the SNMP is received during the normal mode, the first applications 51 correlated with the SNMP return a response, and when the SNMP is received during the power saving mode, the second applications 61 correlated with the SNMP return a response.

A processing destination determination unit 301 determines whether or not the second applications 61 can make a proxy response about received data 213. For example, when "GET REQUEST" of the SNMP is received, it is determined that a proxy response is possible if the first applications can read data stored in the second RAM 22 and make a response as it is, and it is determined that a proxy response is not possible if otherwise. Therefore, when the processing destination determination unit 301 may not determine whether or not the second applications 61 can make a proxy response only with the "protocol", the processing destination determination unit 301 further checks contents of data described in the received protocol (hereinafter, referred to as "protocol data") and determines whether or not a proxy response is possible. Here, it is assumed that a determination regarding whether or not a proxy response is possible about which "protocol" and "protocol data" is defined in advance.

The second communication processing section 63 performs a process for transmitting and receiving data of the second applications 61. For example, the second communication processing section 63 generates the socket 202 using which the second applications 61 perform communication. In addition, the second communication processing section 63 generates the socket 202 using which the first applications transmit and receive data via the socket wrapper 102. Further, the socket 202 may be generated in a plurality.

In response to an instruction from the socket wrapper 102 or the second applications 61, the socket 202 reads data from the second RAM 22 and transmits the data to a socket of a connection destination via the communication I/F 30, or receives data from the socket of the connection destination via the communication I/F 30 and writes the data in the second RAM 22.

The OS 64 performs scheduling of the overall programs executed by the second control unit 20 or memory management. In addition, the OS 64 includes the communication driver 65 for controlling the communication I/F 30, and the second communication processing section 63 controls the communication I/F 30 via the communication driver 65, and thereby transmits and receives data.

The communication I/F 30 is an interface used for the printer 1 to transmit data to the network 8 or to receive data from the network 8. For example, the communication I/F 30 divides transmission data into IP packets which are transmitted to the Ethernet (registered trademark), a wireless LAN, or the like, or combines IP packets received from the Ethernet, the wireless LAN, or the like.

Figure 3:
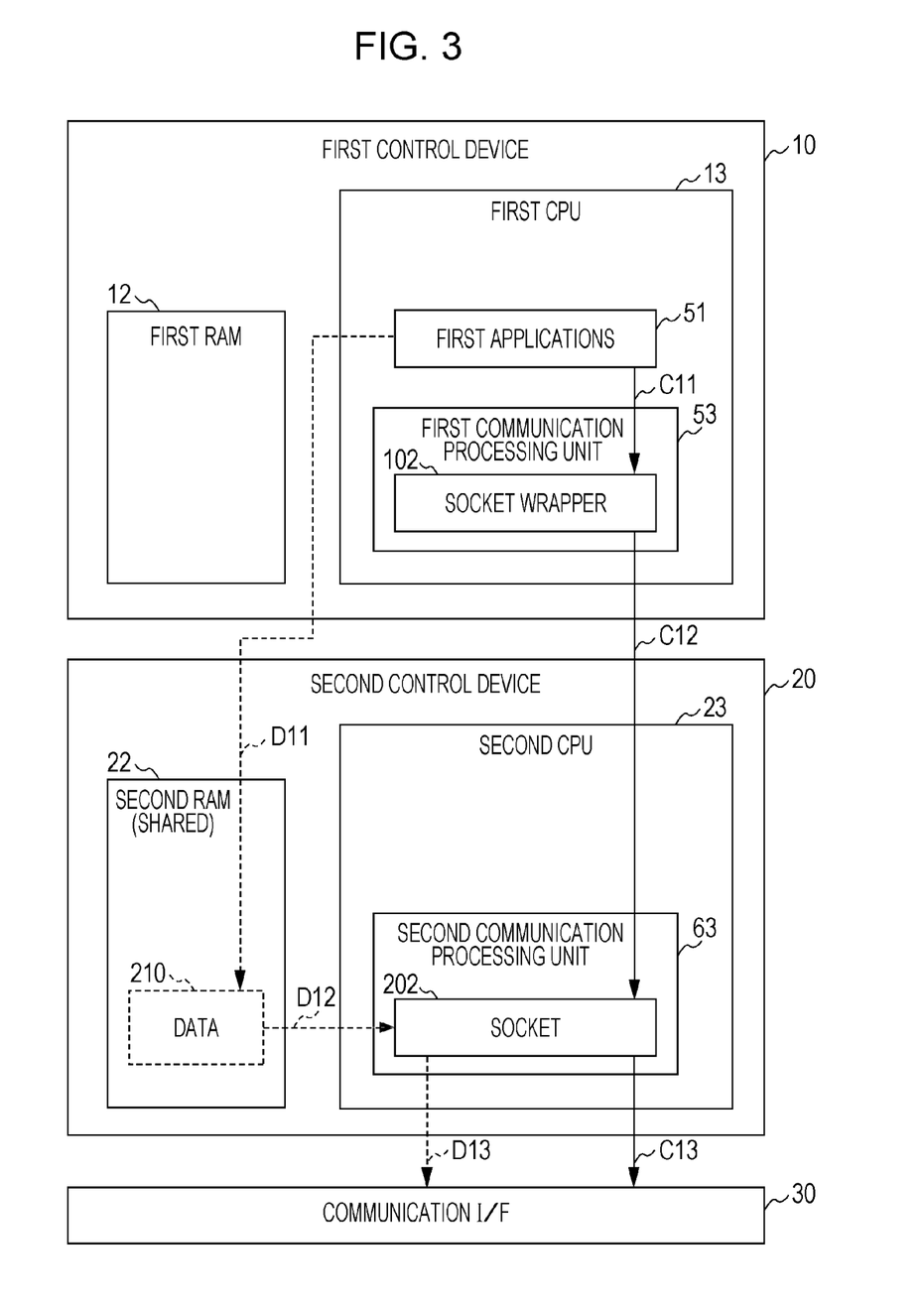
FIG. 3 is a diagram illustrating flows of control commands and transmission data when first applications transmit data.

FIG. 3 is a diagram illustrating flows of control commands and transmission data when the first applications 51 transmit data 210. In the same figure, the solid line arrows indicate flows of the control commands, and the dotted line arrows indicate flows of data.

Figure 4:
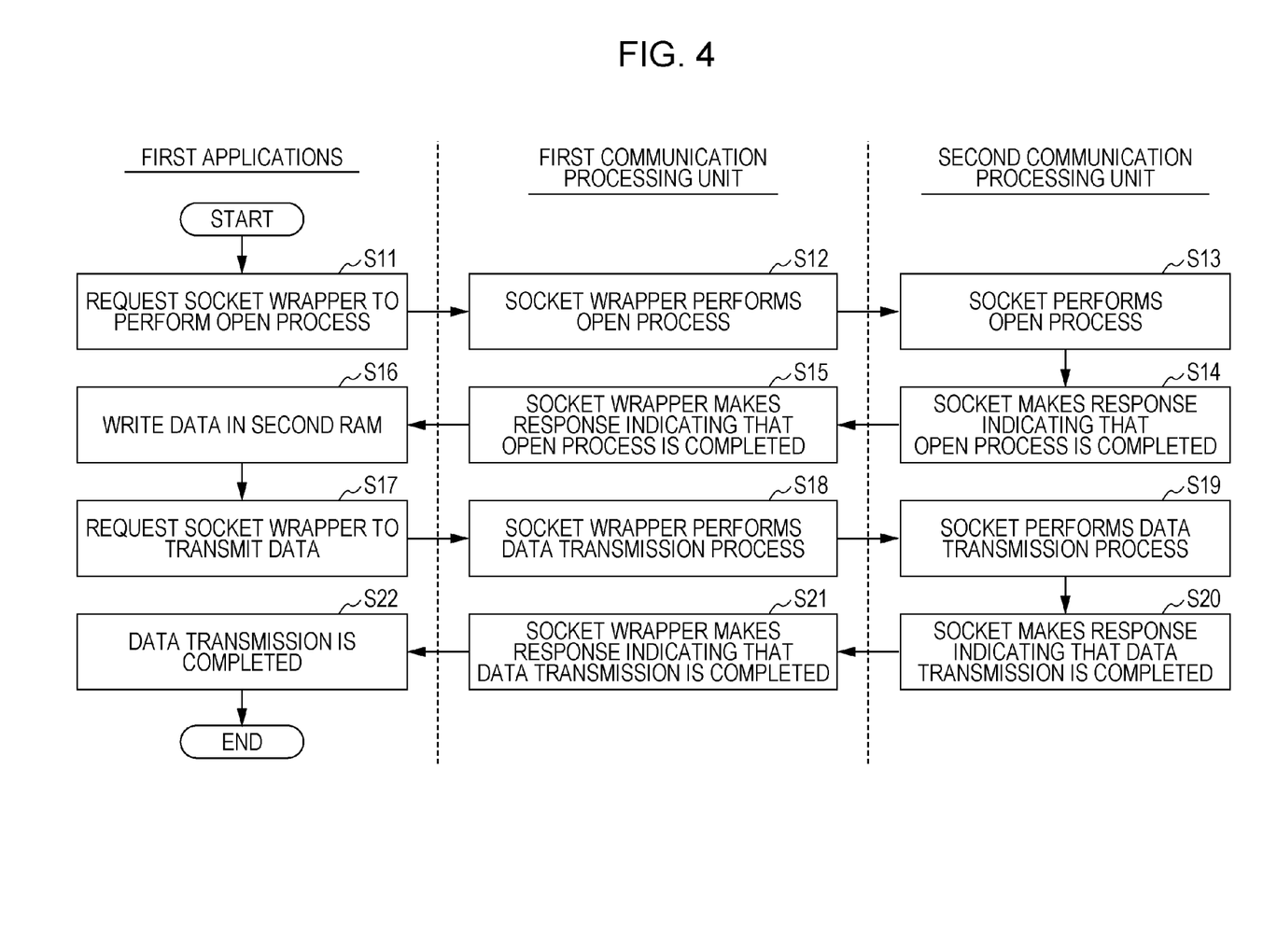
FIG. 4 is a flowchart illustrating processes when the first applications transmit the data.

FIG. 4 is a flowchart illustrating processes when the first applications 51 transmit the data 210.

Hereinafter, processes when the first applications 51 transmit the data 210 will be described with reference to FIGS. 3 and 4.

The first applications 51 request that the socket wrapper 102 of the first communication processing section 53 perform an open process (S11). At this time, the first applications 51 send an IP address of a transmission destination of data to the socket wrapper 102.

The socket wrapper 102 performs the open process in response to the request (S12). For example, the socket wrapper 102 requests that the socket 202 of the second communication processing section 63 perform an open process and sends the IP address of the transmission destination sent from the first applications 51 to the socket 202.

The socket 202 performs the open process in response to the request (S13). For example, the socket 202 tries connection using the IP address sent from the first communication processing section 53 as a connection destination. If the socket connection is successful, data can be transmitted to and received from the socket of the connection destination via the socket 202.

If the socket connection is successful, the socket 202 returns a response indicating that the open process is completed to the socket wrapper 102 (S14).

The socket wrapper 102 receives the response and returns a response indicating that the open process is completed to the first applications 51 (S15).

The first applications 51 receive the response and write the data 210 in a predetermined storage region (for example, a predetermined memory address region) of the second RAM 22 (D11 and S16).

In addition, the first applications 51 request that the socket wrapper 102 transmit the data 210 which has just been written in the second RAM 22 (S17). For example, the first applications 51 send a control command indicating a request for transmission of the data 210 and the storage region of the second RAM 22 in which the data 210 is stored, to the socket wrapper 102 (C11).

The socket wrapper 102 performs a transmission process of the data 210 in response to the request (S18). For example, the socket wrapper 102 sends a control command indicating a request for transmission of the data 210 and the storage region of the second RAM 22 in which the data 210 is stored, to the socket 202 (C12).

The socket 202 receives the request and performs a transmission process of the data 210 (C13 and S19). For example, the socket 202 reads the data 210 from the storage region of the second RAM 22 sent from the socket wrapper 102 (D12), and transmits the data 210 to the socket of the connection destination via the communication I/F 30 (D13).

In addition, if the transmission of the data 210 is successful, the socket 202 returns a response indicating that the transmission is completed to the socket wrapper 102 (S20).

The socket wrapper 102 receives the response and returns a response indicating that the transmission is completed to the first applications 51 (S21).

The first applications 51 receives the response and finishes the transmission process of the data 210 (S22).

In addition, if an initial open process of the socket 202 fails in step S13 of FIG. 4 (in a case where there is no response from the connection destination of the socket, or the like), re-connection may be tried for a predetermined number of times.

In addition, although the first applications 51 directly write the data 210 in the second RAM 22 in the flowchart shown in FIG. 4, the socket wrapper 102 may write the data 210 in the second RAM 22 instead of the first applications 51.

Through the above-described processes, the first applications 51 executed by the first control unit 10 can transmit data via the socket wrapper 102 in the same manner as typical socket communication even if the first control unit 10 does not include a communication I/F.

In addition, one written in the second RAM 22 which is a shared memory is not limited to the transmission data. For example, the first applications 51 which enables the second applications 61 to make a proxy response during the power saving mode writes data necessary for the proxy response in a predetermined storage region of the second RAM at any time. Thereby, as described later, the second applications 61 during the power saving mode can make a proxy response by reading the data stored by the first applications 51 from the predetermined storage region of the second RAM 22.

Figure 5:
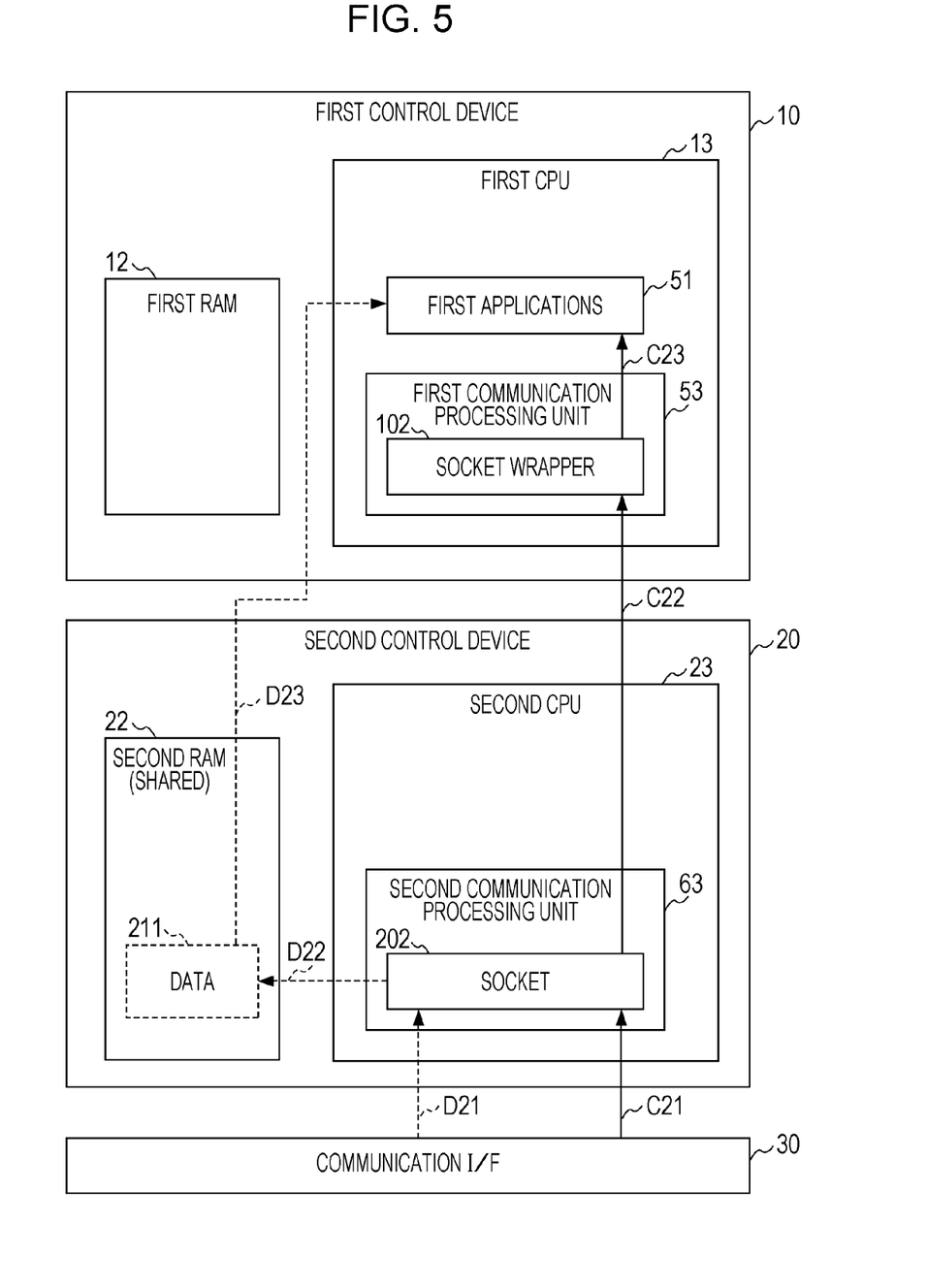
FIG. 5 is a diagram illustrating flows of control commands and data when the first applications receive data.

FIG. 5 is a diagram illustrating flows of control commands and data when the first applications 51 receive data 211. In the same figure, the solid line arrows indicate flows of the control commands, and the dotted line arrows indicate flows of data.

Figure 6:
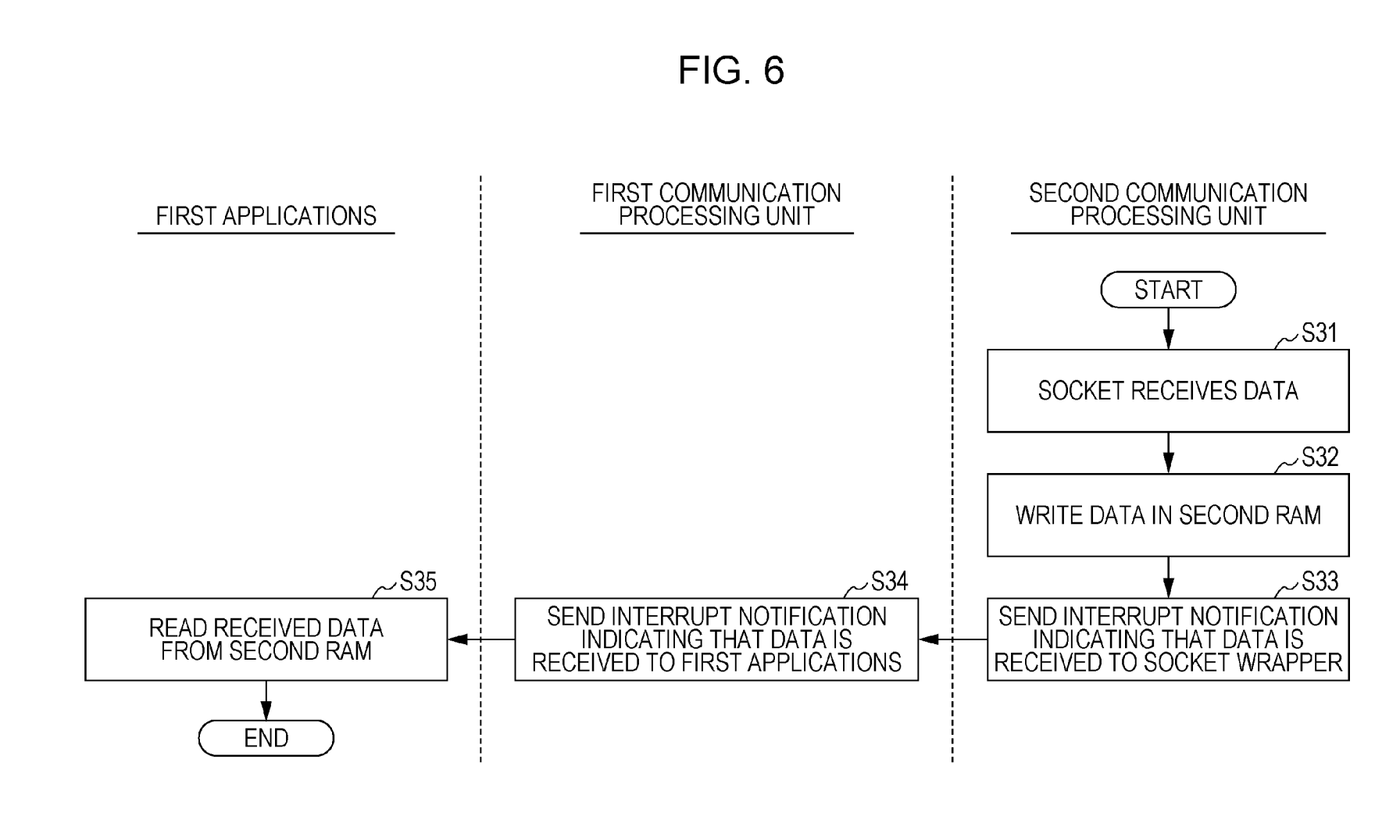
FIG. 6 is a flowchart illustrating processes when the first applications receive the data.

FIG. 6 is a flowchart illustrating processes when the first applications 51 receive the data 211.

Hereinafter, processes when the first applications 51 receive the data 211 will be described with reference to FIGS. 5 and 6.

If receiving the data 211 via the communication I/F 30 (D21, C21, and S31), the socket 202 of the second communication processing section 63 writes the data 211 in a predetermined storage region of the second RAM 22 (D22 and S32). In addition, the socket 202 sends an interrupt notification indicating that the data 211 is received to the socket wrapper 102, and sends the storage region of the second RAM 22 in which the data 211 has just been written (C22 and S33).

The socket wrapper 102 receives the interrupt notification, sends an interrupt notification indicating that the data 211 is received to the first applications 51, and sends the storage position of the data 211 which has just been sent from the socket 202 (C23 and S34).

The first applications 51 receives the interrupt notification and reads the data 211 from the storage region of the second RAM 22 which has just been sent from the socket wrapper 102 (D23 and S35).

Through the above-described processes, the first applications 51 executed by the first control unit 10 can receive the data 211 via the socket wrapper 102 by the use of the socket 202 of the second control unit 20 even if the first control unit 10 does not include a communication I/F.

In addition, although the first applications 51 directly read the data 211 from the second RAM 22 in the flow, the socket wrapper 102 may read the data 211 from the second RAM 22 instead of the first applications 51.

Figure 7:
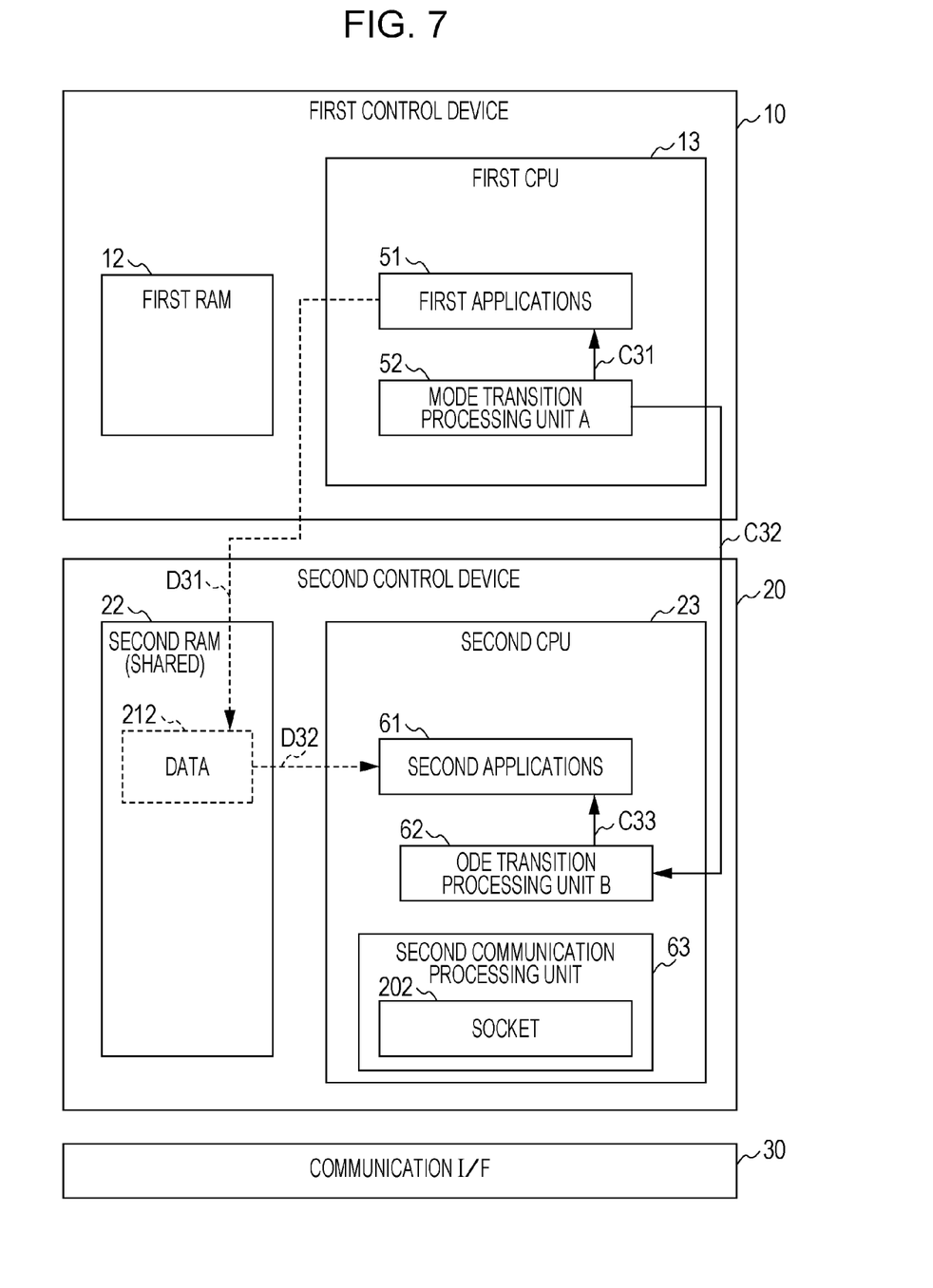
FIG. 7 is a diagram illustrating flows of control commands and data when the first control unit transitions from a normal mode to a power saving mode.

FIG. 7 is a diagram illustrating flows of control commands and data when the first control unit 10 transitions from the normal mode to the power saving mode. In the same figure, the solid line arrows indicate flows of the control commands, and the dotted line arrows indicate flows of data.

Figure 8:
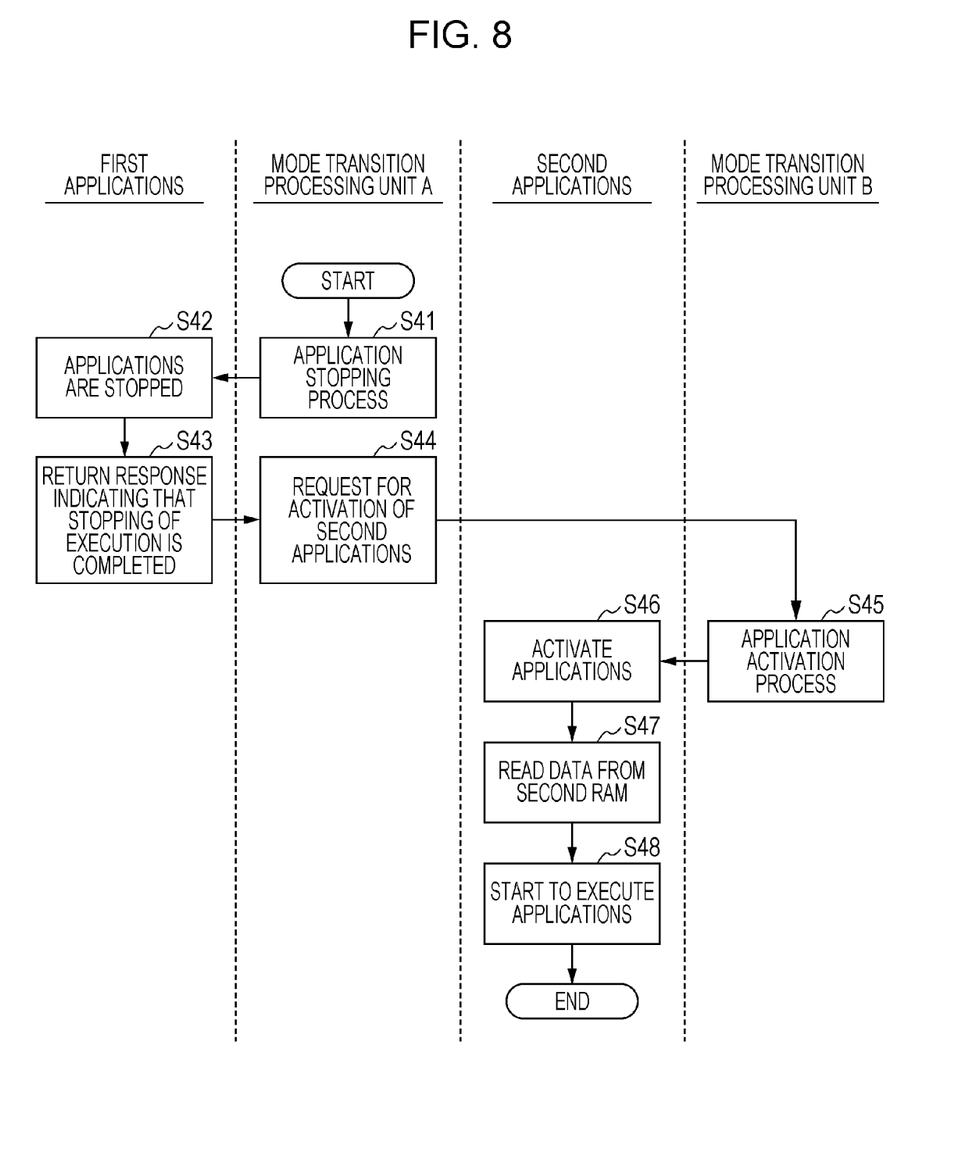
FIG. 8 is a flowchart illustrating processes when the first control unit transitions from the normal mode to the power saving mode.

FIG. 8 is a flowchart illustrating processes when the first control unit 10 transitions from the normal mode to the power saving mode.

Hereinafter, processes when the first control unit 10 transitions from the normal mode to the power saving mode will be described with reference to FIGS. 7 and 8. In addition, here, the second applications 61 are applications which make a proxy response for the first applications 51.

If a transition from the normal mode to the power saving mode starts, the mode transition processing unit A 52 stops execution of the first applications 51 (C31 and S41). The first applications 51 stop execution in response to the request (S42). In addition, in a case where there is data which is necessary for the proxy response and has not been written in the second RAM 22 yet, the first applications 51 write the data in the second RAM 22 before the execution is stopped (D31).

In addition, the first applications 51 return a response indicating that stopping of the execution is completed to the mode transition processing unit A 52 (S43).

The mode transition processing unit A 52 checks that all the first applications 51 stops the execution, and requests that the mode transition processing unit B 62 activate the second applications 61 (C32 and S44).

The mode transition processing unit B 62 activates the second applications 61 which make a proxy response for the first applications 51 in response to the request (C33 and S45). In addition, a correspondence relationship between the first applications 51 and the second applications 61 capable of making a proxy response therefor is the same as described above.

If activated (S46), the second applications 61 read data 212 of the first applications 51 from a predetermined storage region of the second RAM 22 (D32 and S47).

In addition, the second applications 61 read the data 212 and start execution of a proxy response for the first applications 51 (S48).

If the first applications 51 write the data 212 in the first RAM 12 as in the related art, the data is copied to the second RAM 22 from the first RAM 12 when a transition from the normal mode to the power saving mode is performed. However, according to the above-described embodiment, since the first applications 51 write data necessary for a proxy response in the second RAM 22 at any time in the normal mode, the data 212 is not copied to the second RAM 22 from the first RAM 12 when a transition to the power saving mode is performed. Therefore, it is possible to reduce time for the transition to the power saving mode as compared with the case where the data 212 is copied to the second RAM 22 from the first RAM 12.

If time for the transition to the power saving mode is reduced, a possibility that data is received and lost in the course of the transition is lowered.

Figure 9:
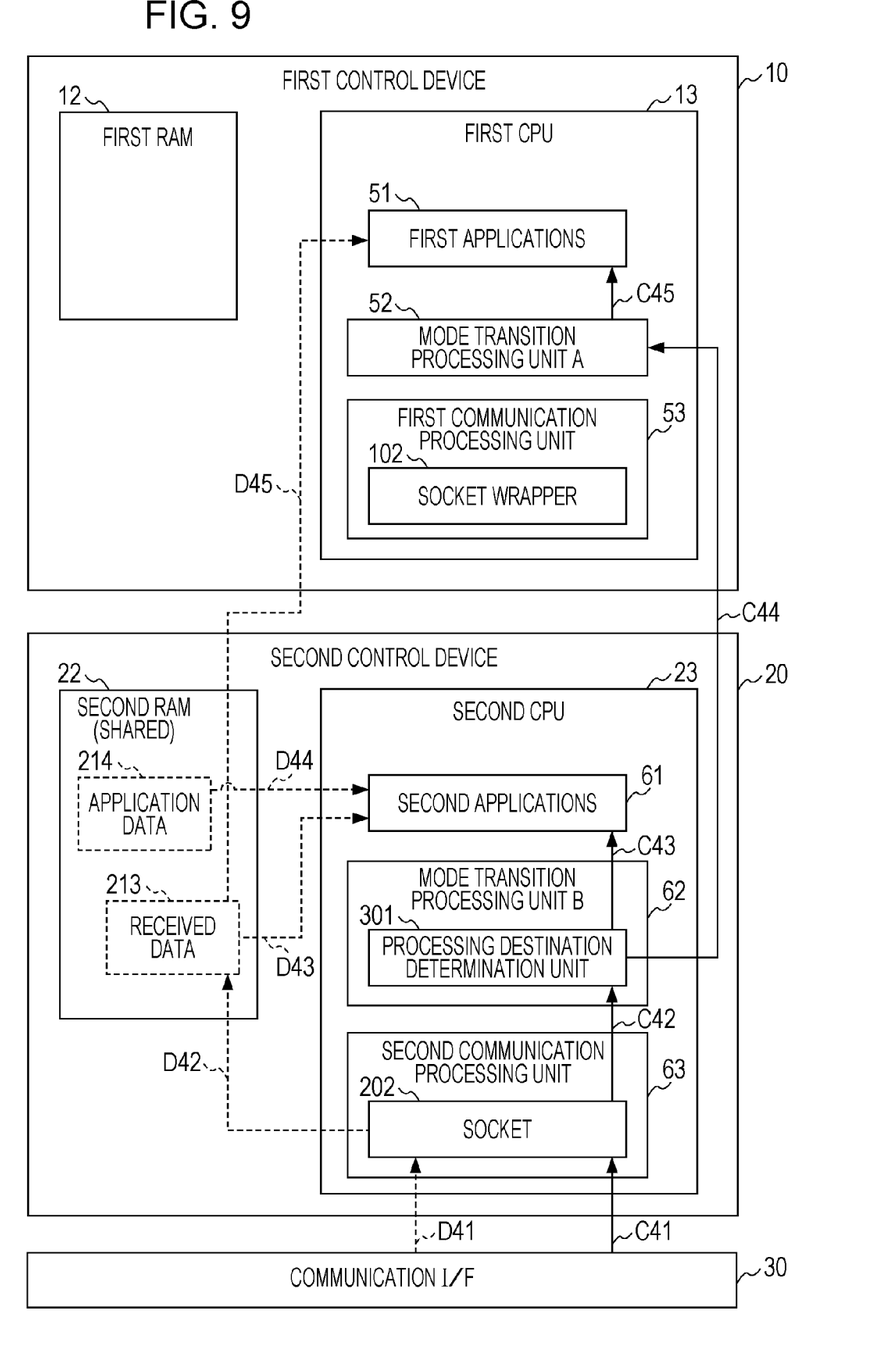
FIG. 9 is a diagram illustrating flows of control commands and data when the first control unit transitions from the power saving mode to the normal mode.

FIG. 9 is a diagram illustrating flows of control commands and data when the first control unit 10 transitions from the power saving mode to the normal mode. In the same figure, the solid line arrows indicate flows of the control commands, and the dotted line arrows indicate flows of data.

Figure 10:
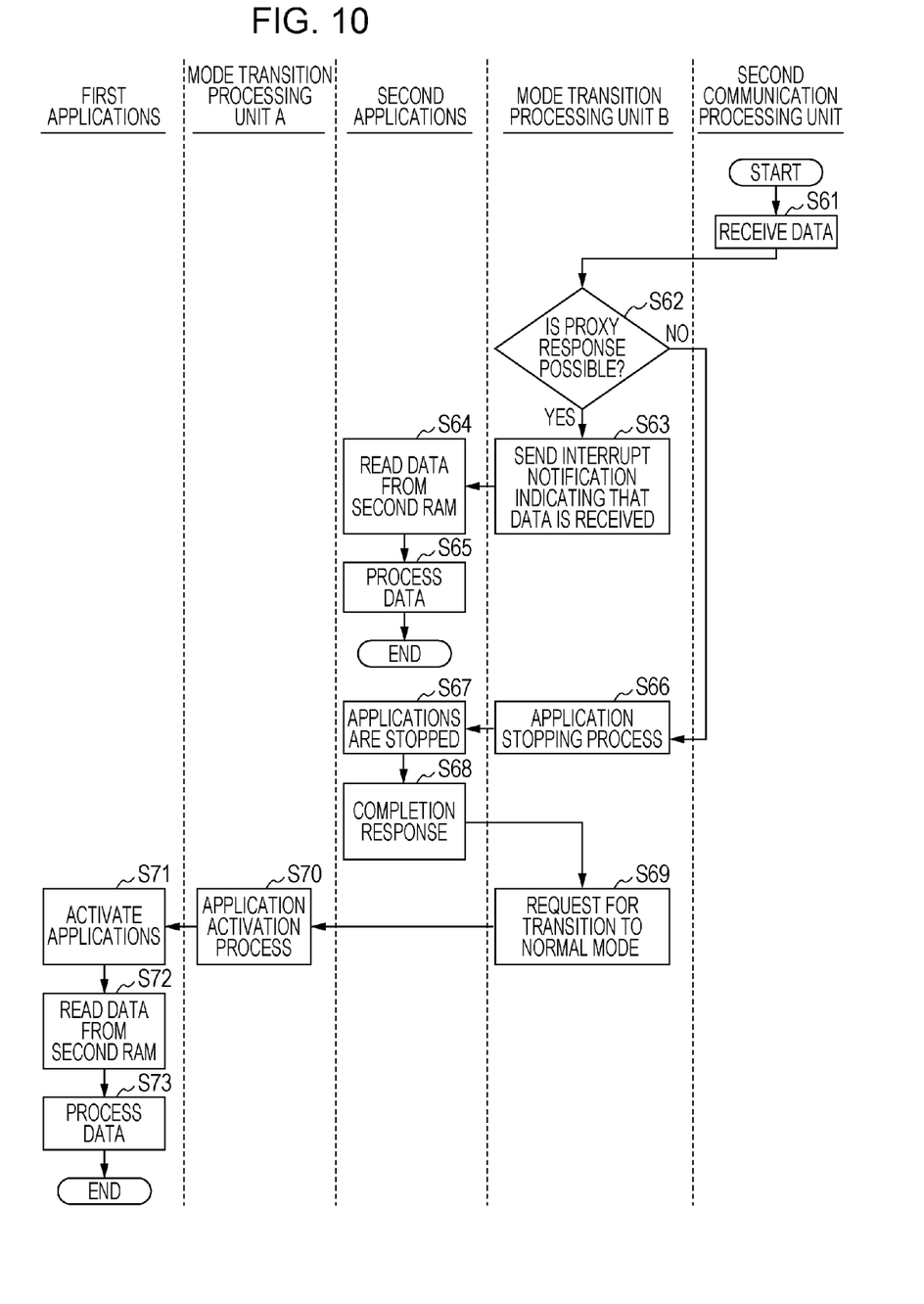
FIG. 10 is a flowchart illustrating processes when the first control unit transitions from the power saving mode to the normal mode.

FIG. 10 is a flowchart illustrating processes when the first control unit 10 transitions from the power saving mode to the normal mode.

Figure 11:
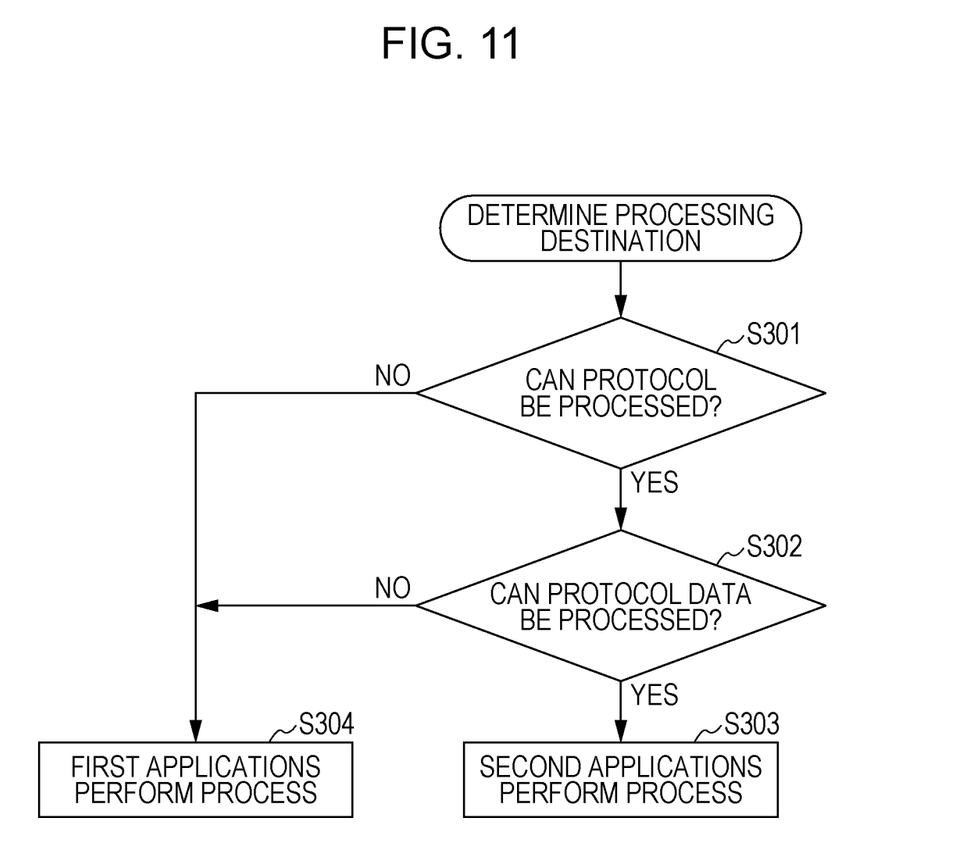
FIG. 11 is a flowchart illustrating processes where the processing destination determination unit determines whether or not the second applications can make a response about received data.

FIG. 11 is a flowchart illustrating processes where the processing destination determination unit 301 determines whether or not the second applications 61 can make a response about received data.

Hereinafter, processes when the first control unit 10 transitions from the power saving mode to the normal mode will be described with reference to FIGS. 9, 10 and 11. In addition, here, the second applications 61 are applications which make a proxy response for the first applications 51.

If receiving data via the communication I/F 30 (D41 and C41), the socket 202 writes the received data 213 in a predetermined storage position of the second RAM 22 (D42), and sends a interrupt notification indicating that the data 213 is received by the processing destination determination unit 301 included in the mode transition processing unit B 62 (C42 and S61).

The processing destination determination unit 301 receives the notification, analyzes the received data 213, and determines whether or not the second applications 61 can make a proxy response about the received data (S62).

Here, a determination method will be described with reference to FIG. 11.

The processing destination determination unit 301 determines whether or not the received data 213 is a "protocol" about which the second applications 61 can make a response (S301). Here, if the received data 213 is a "protocol" about which the second applications 61 can make a response (S301: YES), the processing destination determination unit 301 further determines whether or not the received data 213 is "protocol data" which can be processed by the second applications 61 (S302). In addition, if the received data 213 is "protocol data" about which the second applications 61 can make a proxy response (S302: YES), the processing destination determination unit 301 determines that the second applications 61 can make a proxy response about the received data 213 (S303).

On the other hand, if the received data 213 is a "protocol" (S301: NO) or "protocol data" (S302: NO) about which the second applications 61 may not make a proxy response, the processing destination determination unit 301 determines that the second applications 61 may not make a proxy response about the received data 213 and thus the first applications 51 necessarily make a response (S304).

Here, referring to FIG. 10 again, there will be made a description of a case where the processing destination determination unit 301 determines that the second applications 61 can make a proxy response (S62: YES).

The mode transition processing unit B 62 sends an interrupt notification indicating that the data 213 is received to the second applications 61 (C43 and S63). The second applications 61 receive the notification and read the received data 213 from the second RAM 22 (D43 and S64). In addition, the second applications 61 make a proxy response about a request described in the received data 213 by reading application data 214 of the first applications 51 (D44 and S65). As above, the process where the second applications 61 make a proxy response finishes.

Next, there will be made a description of a case where the processing destination determination unit 301 determines that the second applications 61 may not make a proxy response (S62: NO).

The mode transition processing unit B 62 stops execution of the second applications 61 which are proxy response applications (C43 and S66).

The second applications 61 stop the execution in response to the request (S67).

If stopping of the execution is completed, the second applications 61 return a response indicating that the stopping is completed to the mode transition processing unit B 62 (S68).

The mode transition processing unit B 62 receives the response and requests that the mode transition processing unit A 52 transition to the normal mode (C44 and S69).

The mode transition processing unit A 52 starts activating the first applications 51 in response to the request (C45 and S70), and the first applications 51 are activated (S71).

After activated, the first applications 51 read the received data 213 from the predetermined storage region of the second RAM 22 (D45 and S72). In addition, the first applications 51 make a response about the request described in the received data 213 (S73).

Through the above-described processes, when data about which the second applications 61 can make a proxy response is received during the power saving mode, the second applications 61 can return a response without a transition to the normal mode. Therefore, it is possible to reduce overhead such as a transition from the power saving mode to the normal mode occurring in the related art. Further, since time for the power saving mode can be lengthened, it is possible to reduce power consumption of the printer 1.

Since the first applications 51 can read the received data 213 and the application data 214 from the second RAM 22, it is not necessary to copy data from the first RAM 12 to the second RAM 22. In addition, it is not necessary to initialize the communication interface. Therefore, it is possible to reduce time for a transition from the power saving mode to the normal mode as compared with a case where the copy and the initialization of the communication interface occur. Accordingly, a possibility that data is received and lost in the course of the transition is lowered.

The above-described embodiments of the invention are only an example and are not intended to limit the scope of the invention to the embodiments. A person skilled in the art may implement the invention in other various aspects without departing from the spirit of the invention.

For example, data of the first applications 51 may be stored in a RAM other than the second control unit 20, or may be stored in a third control unit or an external storage device.

The entire disclosure of Japanese Patent Application No. 2011-032353, filed Feb. 17, 2011 is expressly incorporated by reference herein.

What is claimed is:

1. A network communication device comprising:
   a first control unit that has a first application section;
   a second control unit that has a second application section and a communication processing section performing a communication process via a communication network; and
   a shared storage unit that can be used by the first control unit and the second control unit,
   wherein, in a first mode where the first control unit is in an operation state, the first application section performs a predetermined process using the shared storage unit, and the communication processing section performs communication in response to an instruction from the first application section,
   wherein, if the first control unit transitions from the first mode to a second mode in which power consumption is lower than that in the first mode, the first application section stops execution of the process, the second application section performs a process based on data related to the first application section, stored in the shared storage unit, and the communication processing section performs communication in response to an instruction from the second application section, and
   wherein the communication processing section includes a socket that is used to transmit a data to an external device and receive a data from an external device by the communication processing section, and wherein the first control unit further includes a socket wrapper that sends data transmitted by the first application section to the socket and sends data received by the socket to the first application section in the first mode.

2. The network communication device according to claim 1, wherein the second control unit further includes a determination section that determines whether or not a transition from the second mode to the first mode is performed, wherein the determination section determines whether or not data received by the communication processing section can be processed by the second application section in the second mode, and, wherein, if it is determined that the received data can be processed by the second application section, the determination section enables the second application section to make a response about the received data in a state of maintaining the second mode, and if it is determined that the received data may not be processed by the second application section, enables the first control unit to transition from the second mode to the first mode, and enables the first application section to make a response about the received data.

3. The network communication device according to claim 2, wherein the determination section determines whether or not the second application section can make a response based on a communication protocol of the received data.

4. The network communication device according to claim 1, wherein the communication network has an Ethernet specification.

5. A peripheral apparatus comprising the network communication device comprising:

a network communication device comprising:

a first control unit that has a first application section;

a second control unit that has a second application section having the same function as the first application section and a communication processing section performing a communication process via a communication network; and a shared storage unit that can be used by the first control unit and the second control unit, wherein, in a first mode where the first control unit is in an operation state, the first application section performs a predetermined process using the shared storage unit, and the communication processing section performs communication in response to an instruction from the first application section, wherein, if the first control unit transitions from the first mode to a second mode in which power consumption is lower than that in the first mode, the first application section stops execution of the process, the second application section performs a process based on data related to the first application section, stored in the shared storage unit, and the communication processing section performs communication in response to an instruction from the second application section, and wherein the communication processing section includes a socket that is used to transmit a data to an external device and receive a data from an external device by the communication processing section, and wherein the first control unit further includes a socket wrapper that sends data transmitted by the first application section to the socket and sends data received by the socket to the first application section in the first mode.

6. A peripheral apparatus comprising the network communication device according to claim 5, wherein the second control unit further includes a determination section that determines whether or not a transition from the second mode to the first mode is performed, wherein the determination section determines whether or not data received by the communication processing section can be processed by the second application section in the second mode, and, wherein, if it is determined that the received data can be processed by the second application section, the determination section enables the second application section to make a response about the received data in a state of maintaining the second mode, and if it is determined that the received data may not be processed by the second application section, enables the first control unit to transition from the second mode to the first mode, and enables the first application section to make a response about the received data.

7. A peripheral apparatus comprising the network communication device according to claim 6, wherein the determination section determines whether or not the second application section can make a response based on a communication protocol of the received data.

8. A peripheral apparatus comprising the network communication device according to claim 5, wherein the communication network has an Ethernet specification.

9. A network communication method of a network communication device including a first control unit that has a first application section; a second control unit that has a second application section having the same function as the first application section and a communication processing section performing a communication process via a communication network; and a shared storage unit that can be used by the first control unit and the second control unit, comprising:

causing the first application section to perform a predetermined process using the shared storage unit, and causing the communication processing section to perform communication in response to an instruction from the first application section, in a first mode where the first control unit is in an operation state; and causing the first application section to stop execution of the process, the second application section performs a process based on data related to the first application section, stored in the shared storage unit, and causing the communication processing section to perform communication in response to an instruction from the second application section, if the first control unit transitions from the first mode to a second mode in which power consumption is lower than that in the first mode, and wherein the communication processing section includes a socket that is used to transmit a data to an external device and receive a data from an external device by the communication processing section, and wherein the first control unit further includes a socket wrapper that sends data transmitted by the first application section to the socket and sends data received by the socket to the first application section in the first mode.

* * * * *